United States Patent
Miu et al.

(10) Patent No.: US 10,095,924 B1
(45) Date of Patent: Oct. 9, 2018

(54) DOCUMENT AUTHENTICATION

(71) Applicant: MorphoTrust USA, LLC, Billerica, MA (US)

(72) Inventors: Stephen Miu, Chelmsford, MA (US); Ashley S. R. Tiguy, Billerica, MA (US); Daniel Poder, Brookline, MA (US); Yecheng Wu, Lexington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 82 days.

(21) Appl. No.: 15/395,246

(22) Filed: Dec. 30, 2016

Related U.S. Application Data

(60) Provisional application No. 62/273,799, filed on Dec. 31, 2015.

(51) Int. Cl.
*G06K 9/00* (2006.01)
*G06K 9/20* (2006.01)

(52) U.S. Cl.
CPC ....... *G06K 9/00463* (2013.01); *G06K 9/2063* (2013.01); *G06K 2209/50* (2013.01)

(58) Field of Classification Search
None
See application file for complete search history.

(56) References Cited

U.S. PATENT DOCUMENTS

| | | | |
|---|---|---|---|
| 5,109,439 A * | 4/1992 | Froessl | G06F 17/30011 382/305 |
| 5,783,024 A | 7/1998 | Forkert | |
| 6,003,581 A | 12/1999 | Aihara | |
| 6,007,660 A | 12/1999 | Forkert | |
| 6,066,594 A | 5/2000 | Gunn et al. | |
| 6,159,327 A | 12/2000 | Forkert | |
| 6,283,188 B1 | 9/2001 | Maynard et al. | |
| 7,131,585 B2 | 11/2006 | Gyi et al. | |
| 2005/0035590 A1 | 2/2005 | Jones et al. | |
| 2005/0063027 A1 | 3/2005 | Kenen | |
| 2005/0132194 A1 | 6/2005 | Ward | |
| 2016/0096392 A1 | 4/2016 | Jones et al. | |
| 2016/0096395 A1 | 4/2016 | Jones et al. | |

OTHER PUBLICATIONS

U.S. Appl. No. 62/098,849, filed Dec. 31, 2014, Jones.

* cited by examiner

*Primary Examiner* — Mark Roz
(74) *Attorney, Agent, or Firm* — Fish & Richardson P.C.

(57) ABSTRACT

A computer-assisted method includes: accessing information encoding a high-resolution image of an identification document, the high-resolution image captured from a camera of a mobile computing device; extracting personally identifiable information (PII) printed on more than one locations on the front of the identification document; correlating the PII to determine a first authentication factor; inspecting the high-resolution image to detect at least one fine-print feature from a substrate of the identification document, the at least one fine-print feature not detectable by naked eyes alone and without a visual aid; in response to (i) determining a match for the PII and (ii) determining that at least one fine-print feature is present, correlating the PII with information content from the at least one fine-print feature; and in response to determining that the PII are correlated with information content from the at least one fine-print feature that the identification document as authentic.

15 Claims, 5 Drawing Sheets

DOCUMENT AUTHENTICATION

CROSS-REFERENCE TO RELATED APPLICATIONS

This application claims priority to U.S. Application No. 62/273,799, filed Dec. 31, 2015. This application is incorporated by reference in its entirety.

TECHNICAL FIELD

This paper generally relates to identification document

BACKGROUND

Identification documents are issued by government and non-government entities for identification purposes.

SUMMARY

In one aspect, some implementations provide a computer-assisted method that includes: accessing, at a mobile computing device, information encoding a high-resolution image of an identification document, the high-resolution image captured from a camera of the mobile computing device; extracting, by the mobile computing device, personally identifiable information (PII) printed on more than one locations on the front of the identification document; correlating, by the mobile computing device, the PII from the more than one locations to determine a first authentication factor; inspecting, by the mobile computing device, the high-resolution image to detect at least one fine-print feature from a substrate of the identification document, the at least one fine-print feature not detectable by naked eyes alone and without a visual aid; in response to (i) determining the first authentication factor that the PII from more than one locations match and (ii) determining a second authentication factor that the at least one fine-print feature is present, correlating, by the mobile computing device, the PII from the more than one locations with information content from the at least one fine-print feature to determine a third authentication factor; and in response to determining the third authentication factor that the PII are correlated with information content from the at least one fine-print feature, determining, by the mobile computing device, that the identification document as authentic.

Implementations may include one or more of the following features.

Inspecting the high-resolution image to detect at least one fine-print feature from a substrate of the identification document may include inspecting the high-resolution image to detect at least one fine-print feature presented by one or more glyph symbols. Inspecting the high-resolution image to detect the at least one fine-print feature in one or more glyph symbols may include inspecting the high-resolution image to detect the at least one fine-print feature presented by glyph symbols that form a graphic pattern characteristic of an entity that issued the identification document. The method may further include: determining, as a fourth authentication factor, that the graphic pattern correlates with information on the identification document that points to the entity that issued the identity document.

Inspecting the high-resolution image to detect the at least one fine-print feature in one or more glyph symbols may include inspecting the high-resolution image to detect the at least one fine-print feature in glyph symbols that form a textual pattern characteristic of an entity that issued the identification document. The method may include: determining, as a fourth authentication factor, that the textual pattern correlates with information on the identification document that points to the entity that issued the identity document.

Inspecting the high-resolution image to detect the at least one fine-print feature in one or more glyph symbols may include inspecting the high-resolution image to detect the at least one fine-print feature in glyph symbols that form a textual pattern specific to the subject identified by the identification document. Correlating the PII from the more than one locations with information content from the at least one fine-print feature may include: correlating the PII from the more than one locations with information from the textual pattern specific to the subject identified by the identification document.

Inspecting the high-resolution image to detect the fine print feature from a substrate of the identification document may include inspecting the high-resolution image to detect the at least one fine-print feature as line segments forming a graphic image. Inspecting the high-resolution image to detect the fine print feature from a substrate of the identification document may include inspecting the high-resolution image to detect the at least one fine-print feature as half-tone dots forming a graphic image. Accessing information encoding a high-resolution image of an identification document may include accessing the high-resolution image of at least 6 mega pixels as captured from the camera of the mobile computing device.

In another aspect, some implementations provide a mobile computing device that includes a processor and a camera, wherein the camera is configured to capture a digital image of at least 10 mega pixels, and wherein the processor is configured to: access information encoding a high-resolution image of an identification document, the high-resolution image captured from the camera of the mobile computing device; extract personally identifiable information (PII) printed on more than one locations on the front of the identification document; correlate the PII from the more than one locations to determine a first authentication factor; inspect the high-resolution image to detect at least one fine-print feature from a substrate of the identification document, the at least one fine-print feature not detectable by naked eyes alone and without an assistive device; in response to (i) determining the first authentication factor that the PII from more than one location match and (ii) determining a second authentication factor that the at least one fine-print feature is present, correlate the PII from the more than one locations with information content from the at least one fine-print feature to determine a third authentication factor; and in response to determining the third authentication factor that the PII are correlated with information content from the at least one fine-print feature, determine that the identification document as authentic.

Implementations may include one or more of the following features.

The processor may be configured to inspect the high-resolution image to detect fine print feature from a substrate of the identification document by inspecting the high-resolution image to detect at least one fine-print features in one or more glyph symbols. The processor may be configured to inspect the high-resolution image to detect the at least one fine-print feature in one or more glyph symbols by inspecting the high-resolution image to detect the at least one fine-print feature in glyph symbols that form a graphic pattern characteristic of an entity that issued the identification document. The processor may be further configured to:

determine, as a fourth authentication factor, that the graphic pattern correlates with information on the identification document that points to the entity that issued the identity document.

The processor may be configured to inspect the high-resolution image to detect the at least one fine-print feature in one or more glyph symbols by inspecting the high-resolution image to detect the at least one fine-print feature in glyph symbols that form a textual pattern characteristic of an entity that issued the identification document. The processor may be further configured to: determine, as a fourth authentication factor, that the textual pattern correlates with information on the identification document that points to the entity that issued the identity document. The processor may be further configured to: inspect the high-resolution image to detect the at least one fine-print feature in one or more glyph symbols by inspecting the high-resolution image to detect the at least one fine-print feature in glyph symbols that form a textual pattern specific to the subject identified by the identification document. The processor may be configured to correlate the PII from the more than one locations with information content from the at least one fine-print feature by: correlating the PII from the more than one locations with information from the textual pattern specific to the subject identified by the identification document. The processor may be configured to inspect the high-resolution image to detect the fine print feature from a substrate of the identification document by inspecting the high-resolution image to detect the at least one fine-print feature as line segments forming a graphic image. The processor may be configured to inspect the high-resolution image to detect the fine print feature from a substrate of the identification document by inspecting the high-resolution image to detect the at least one fine-print feature as half-tone dots forming a graphic image.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

DESCRIPTION OF DRAWINGS

Like reference symbols in the various drawings indicate like elements.

DETAILED DESCRIPTION

Figure 1:
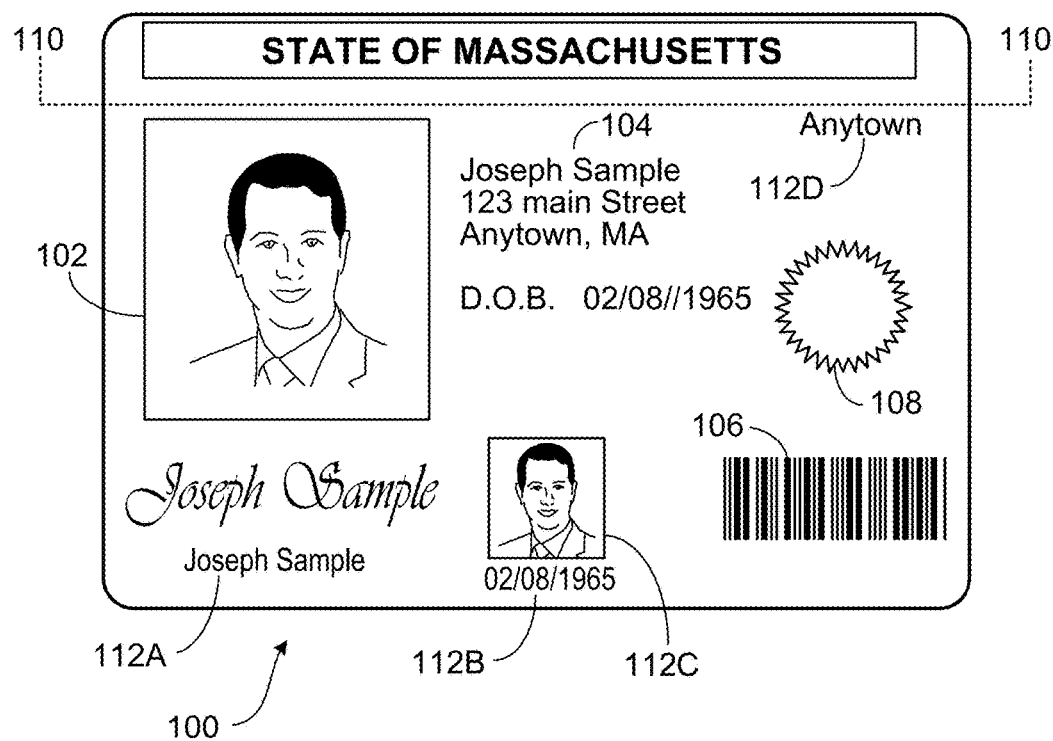
FIG. 1 is an example of an identification document with a government issued substrate.

Identification documents, such as driver's licenses or passports, are frequently used to back up identity assertions of document holders. These identification documents are also used to verify ages, prove driving privileges, access a secure area, cash a check, and so on. Identification cards often become the target for counterfeiting and fraud. To deter such deleterious acts, security features can be embedded into identification documents. The security features on the identification documents can provide authorities and card holders with a sense of security to preserve, for example, the trust in the asserted identity. Large number of transactions may rely on the authenticity of these underlying identification documents. As such, the security features on the identification documents can become paramount to support an identification document as a genuine and up-to-date identity proof.

Unlike currencies that are also in wide use by the populace, identification documents are unique to the particular document holder. Therefore, the security features on identification documents can incorporate personalization element to attest to ownership and further heighten the difficulty for counterfeiting and fakery. Implementations disclosed herein incorporate laser-engraved security features underneath the surface of an identification document. Some implementations may embed personally identifiable information in the laser-engraved features. Some implementations may provide biometric representations in the laser engraved features. In some instances, the personally identifiable information or the biometric representation can be embedded into a metalized holographic image underneath the surface of the identification document.

Identification documents ("ID documents") are broadly defined to include, for example, credit cards, bank cards, phone cards, passports, driver's licenses, network access cards, employee badges, debit cards, security cards, visas, immigration documentation, national ID cards, citizenship cards, permanent resident cards (e.g., green cards), Medicare cards, Medicaid cards, social security cards, security badges, certificates, identification cards or documents, voter registration cards, police ID cards, military ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image. The cards or documents may in addition carry other variant data (i.e., data specific to a particular card or document, for example an employee number) and invariant data (i.e., data common to a large number of cards, for example the name of an employer, the issuing agency or jurisdiction). All of the cards described above will hereinafter be generically referred to as "ID documents."

Within the confines of this disclosure, the identification documents may include a substrate from the issuer. For example, government-issued identification document may include a substrate from a government agency such as the Department of Motor Vehicles ("DMV"). The substrate may include unique identification marks to attest to the originality of the substrate. Such identification marks may be made by techniques that include high resolution offset printing patterns. For example, each government agency may approve unique substrate materials, further differentiated by artwork designs. These artwork designs may be called "guilloche designs", and are specific to each agency or jurisdiction. By scanning these design patterns within a certain tolerance, a template can be created to be queried or relied up on in the future to validate the authenticity of the document. In particular, the template may be built to include identification marks from multiple jurisdictions so that subsequent look-ups may leverage the database of information to quickly determine the authenticity of an identification document. As each state or jurisdiction may have more than one variants of driver's licenses in circulation, multiple templates may be used for each state. For example, some states may have more than one version because these states implemented driver's licenses in response to the RealID Act. In these states, for a sun-set period, the legacy driver's licenses may still be used.

Identification document can be loaded with fine-print patterns, sometimes known as guilloche patterns. These fine-print patterns may not be visible under naked eyes. Rather, an aid device, like a loupe or magnifying glass, is often used to inspect an identification document for the presence of these fine-print patterns. Recent years have seen tremendous improvements in the resolution power of cameras on smartphone device. By way of an example, the iPhone 6S device has an image resolution amounting to 12-megapixels per static camera image. Some implementations capitalize this phenomenal resolution to achieve automatic verification of identification documents. The resolution may indicate more than 6-megapixels per static camera image. In particular, a mobile application on a smartphone device may drive an onboard camera to capture a high-resolution image of an identification document, such as a driver's license, and then in response to detecting the presence fine-print security features in the substrate of the driver's license, compare the information content from the fine-print security features with information printed on the identification document. For example, the information printed on the identification document may have been through an optical character recognition (OCR) process after the high-resolution image has been captured.

FIG. 1 illustrates an example identification document 100 including a photo 102 of the card holder. ID document 100 also includes personally identifiable information (PII) area 104, machine-readable zone (MRZ) 106, security feature 108, and labelling information area 110. ID document 100 may also include ghost features 112A-112D to encode, for example, portions of PII or a biometric of the card holder.

In more detail, ID document 100 can be formed using a core material such as polyvinyl chloride (PVC), TESLIN®, polycarbonate (PC), or polycarbonate-hybrid. Photo 102 may include a facial portrait of the card holder. Photo 102 may be a color image, or a monochromatic image. ID document 102 may include ghost photo 112, which can be a screened-back or "Ghost" version of photo 102. In at least one embodiment, the ghost can be a color or grayscale halftone version of photo 102. Ghost photo 102 may also preferably visible under normal viewing conditions. In some implementations, ID document 100 may include a digital watermark that may correspond to photo 102 and is not visible under "normal" viewing conditions and without visual aids. These features do not rely on offset-printing, often used to generate guilloche patterns. In some implementations, ID document 100 may include an optically variable photo. Labelling information 110 generally encodes fixed information that does not change for card holders. For example, the fixed information may include jurisdictional information or employer information to show the issuing authority.

Personally identifiable information (PII) area 104 shows the name, residential address, and date of birth of the card holder. "Personalization", "Personalized data" and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some implementations, personal/variable data can include some fixed data, as well.

For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalization can also be achieved using the fine-resolution offset-printing processes, which enable guilloche in the personalization layer that is different from the substrate or the cover. Personalized and/or fixed data is also intended to refer to information that is (or can be) cross-linked to other information on the identification document or to the identification document's issuer. For example, personalized data may include a lot number, inventory control number, manufacturing production number, serial number, digital signature, etc. Such personalized or fixed data can, for example, indicate the lot or batch of material that was used to make the identification document, what operator and/or manufacturing station made the identification document and when, etc. Further details about such personalized data on identification cards may be found in the following commonly assigned patent applications, each of which is incorporated by reference: "Inventory Management System and Methods for Secure Document Issuance," 60/529,847, filed Dec. 15, 2003, and counterpart non-provisional application of the same title by Gyi, Kaylor and Dong, filed on Dec. 15, 2004, Ser. No. 10/848,526; "Uniquely Linking Security Elements in Identification Documents," Ser. No. 60/488,536, filed Jul. 17, 2003, and non-provisional counter-part Ser. No. 10/893, 149; and "Protection of Identification Documents Using Open Cryptography," Ser. No. 10/734,614, filed Dec. 12, 2003.

Machine readable zone (MRZ) 106 shows a machine readable code encoding, for example, information correlatable with the PII. In one example, the machine readable code may include only the name or portions of the name (e.g., the first name, the last name, or the first three letters of the last name) of the holder. In another example, the machine readable code may include a numerical string encoding portions of the data of birth. In yet another example, the machine readable code may include portions of the residential address. In all these examples, the portions of the PII as encoded in the machine-readable code can be correlated with the printed PII, as shown in area 104. By way of illustration, ghost features 112A-112D are included to encode, for example, portions of PII and a biometric representation of the card holder. For example, the name information is encoded in ghost feature 112A, the date of birth information in 112B, facial portrait in 112C, and residential address information in 112D.

Security feature 108 may include a KINEGRAM®, hologram, optically variable device (OVD), UV or IR indicia, etc. Some implementations provide laser-engraved security feature 108 to embed portions of PII on security feature 108. In some instances, the laser-engraving can cause portions of PII to be carved into metalized holographic images of security feature 108. Some implementations provide laser-engraved security feature 108 to embed a biometric representation of the card holder, such as a facial portrait, a finger-print. In some instances, the laser-engraving can cause the biometric representation to be carved into metalized holographic images of security feature 108.

Labelling information 110 generally encodes fixed information that does not change for card holders. For example, the fixed information may include jurisdictional information or employer information to show the issuing authority. Card issuance information area 116A and 116B generally records information on card expiration date or card issuance date. Such data may also differentiate the type of the underlying credential, whether it is a driver license, a state ID, a voter ID, or a Gun Permit.

Notably, security feature 114 shows special information unique to the card holder only visible at certain observation angles from the top surface of ID document 100. The special information may include the person's biometric information (such as a facial portrait or a finger print). The special information may also include portions of PII of the card holder. The security feature 114 may be created by laser write, laser engrave, or laser shadow technologies, as provided in further details following commonly assigned patent applications, each of which is incorporated by reference: "System and Method for Laser Write," 62/060,904, filed Oct. 7, 2014, "System and Method for Laser Write," 62/142,315, filed Apr. 2, 2015, "System and Methods for Laser Shadow," 62/098,849, filed Dec. 31, 2014.

An example of identification mark embedded in the substrate may include a KINEGRAM® feature with markings. In one example, two marks are may each encode the same alphanumerical string that attest to, for example, an identity of the issuing agency. This carving capability creates a pattern in the KINEGRAM® that can include, for example, an emblem of the issuing agency. In some implementations, the carved textual information can encode information identifying the issuing agency in the KINEGRAM®. Notably, these implementations encode portions of the information identifying the issuing agency directly within, for example, the holographic structure of the KINEGRAM® itself, rather than printing such portions of PII on top of the holographic structure of the KINEGRAM®. A programmed mark can be embedded into the holographic structure of the KINEGRAM®. In one instance, an image of an emblem of the issuing agency may be engraved into the metalized structure of the holographic images. In another instance, a portion of the facial portrait of the agency's representative (person or mascot) may be engraved into the metalized structure of the holographic images. In some examples, the images or facial-portrait portions may be positive. In other examples, the images or facial-portrait portions can be positive. In still other examples, the images or facial portrait portions may be in half-tone.

Figure 2A:
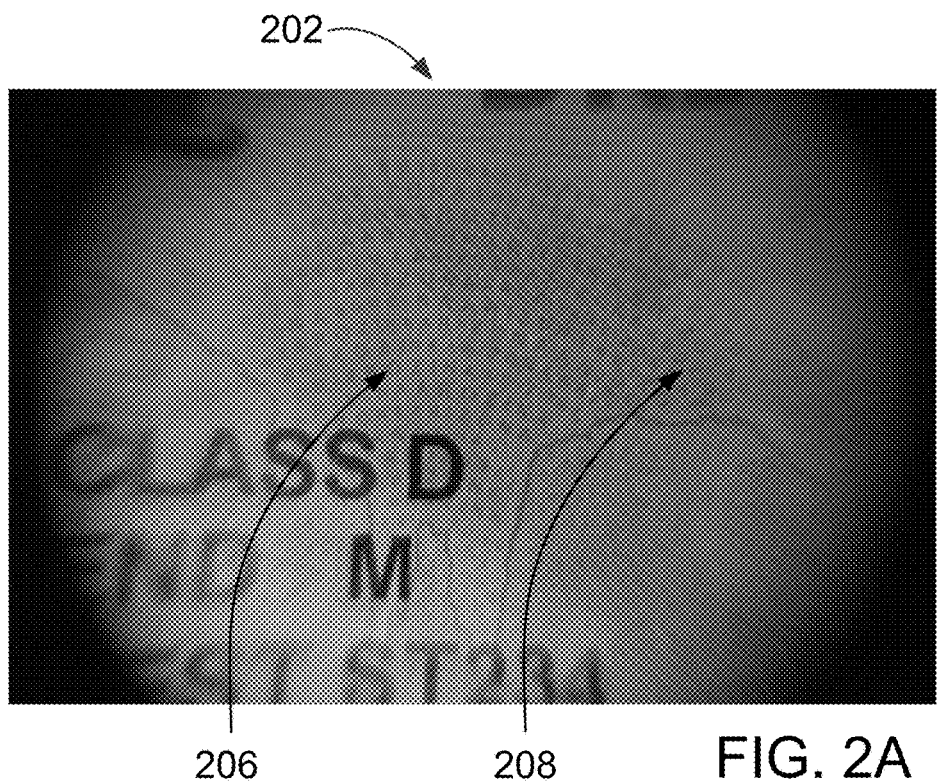
FIG. 2A shows an example of a zoomed view, through a zooming glass, of fine-print features in letter symbols on the substrate of an identification document.

FIG. 2A shows an example of a zoomed view 202, through a zooming glass, of fine-print features in letter symbols on the substrate of an identification document. An identification document may include security features such as fine-print features in the form of guilloche patterns, also known as guilloche designs. These fine-print features are not visible to naked eyes alone and without visual assistance such as a zooming glass. The zoomed view 202, for example, is provided through a zooming glass with a magnification factor of 20 or above. In this view, the guilloche patterns are present on a substrate of the identification document and arranged as arcs of letter symbols. Letter symbol 206 is disposed on an arc that is more inner than letter symbol 208. In some instances, the letter symbols may be distributed on concentric rings, contours of polygon shapes forming varying perimeters, or contours of more graphic patterns, as revealed in further detail below.

Figure 2B:
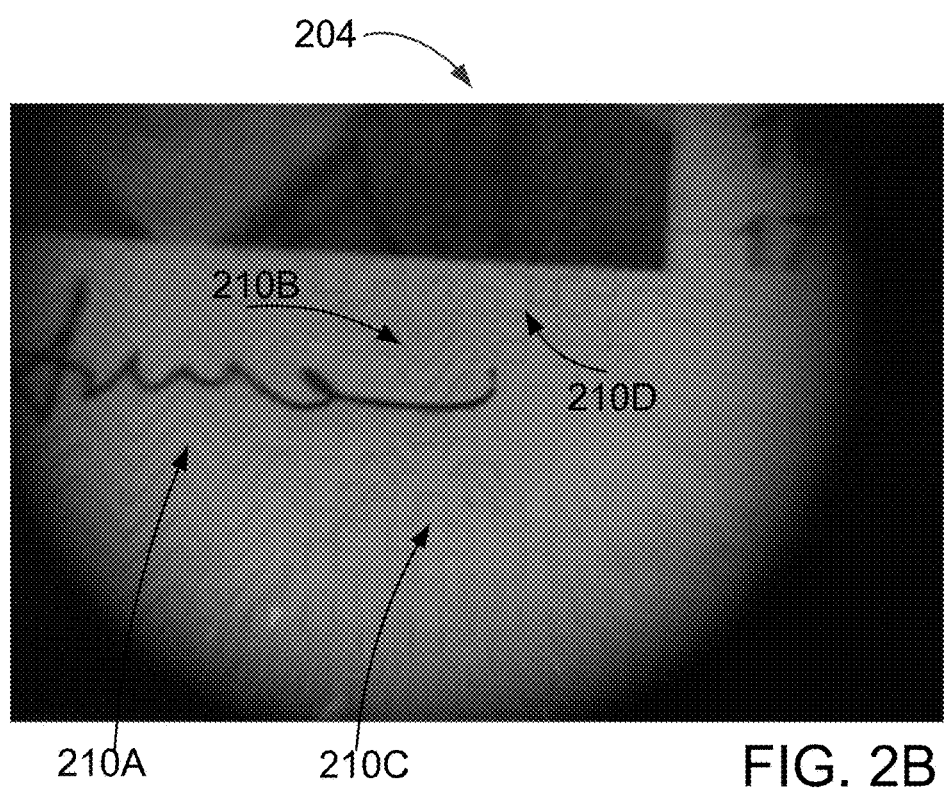
FIG. 2B shows another example of a zoomed view, through a zooming glass, of fine-print features composed in shape symbols on the substrate of an identification document.

FIG. 2B shows another example of a zoomed view 204, through a zooming glass, of fine-print features composed in shape symbols on the substrate of an identification document. In this illustration, the shape symbols are arranged to form wavy pattern 201A, wedge patterns 210B, cross patterns 210C, and tile patterns 210D. These shape symbols and the letter symbols shown in FIG. 2A are examples of glyph symbols. Other examples can include symbols of arbitrary shape or appearance.

Figure 2C:
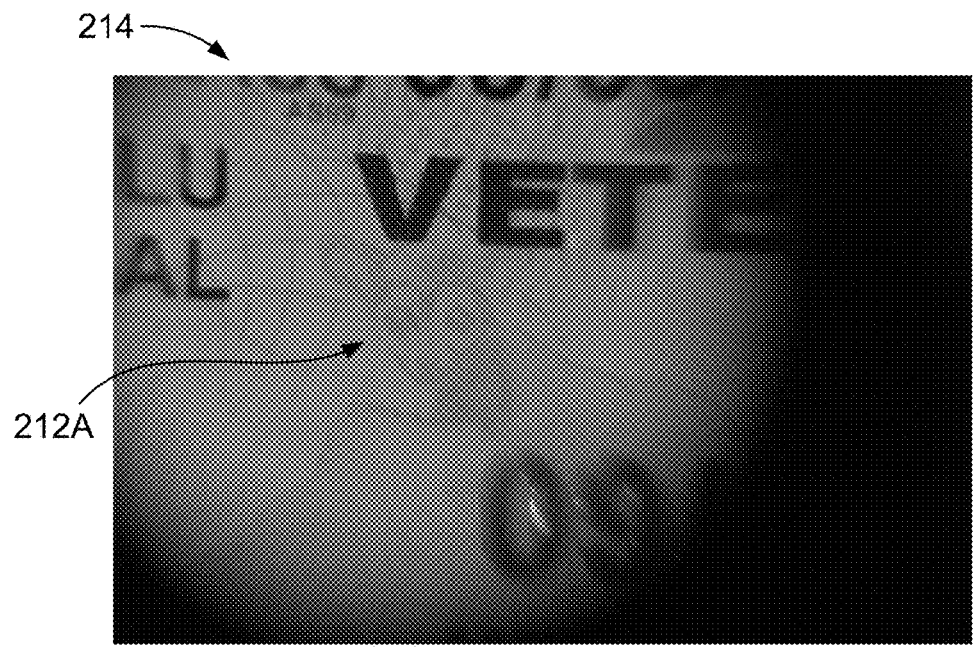
FIG. 2C shows yet another example of a zoomed view, through a zooming glass, of an line imagery in fine prints on the substrate of an identification document.

FIG. 2C shows yet another example of a zoomed view 214, through a zooming glass, of a line imagery in fine-print features on the substrate of an identification document. In this illustration, the line imagery represents an image of a roe deer. In some implementations, the fine-print feature may be present not only on a hidden scale—something that cannot be visible unless under a visual aid, but also on a reduced contrast. In other words, a digital camera device would need prenominal dynamic range, such as, for example 120 dB in order to discern and capture the minute distinctions conveyed through the fine-print features. In some implementations, the fine-print features may be arranged as half-tone graphic composed by a matrix of dots of varying gray scales (and/or chromatic scales).

Figure 2D:
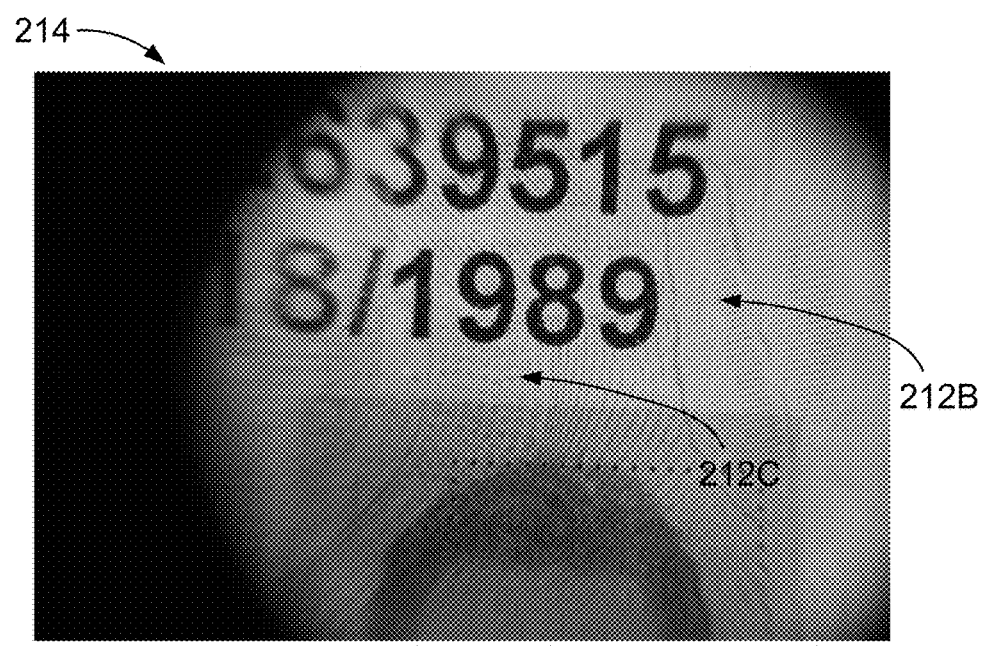
FIG. 2D shows still another example of a zoomed view, through a zooming glass, of strings of characters specific to the person portrayed in the identification document.

FIG. 2D shows still another example of a zoomed view 216, through a zooming glass, of strings of characters specific to the person portrayed in the identification document. In particular, fine-print feature 212C may encode letters specific to the person identified by the identification document. The letters may indicate, for example, the initial (s) of the person, the gender of the person, or the birth date/month/year of the person. The letters may also reflect the residential town/county/state of the person. As demonstrated, such fine-print features can be personalized to reflect the identity information of the person identified by the identification document. In particular, the information content from the fine-print features should correlate with portions of the PII of the person identified on the identification document. Some implementations may use this correlation as an authentication factor that the identification document is authentic and has not been tempered with.

As an illustration, fine-print feature 212B may represent an item specific to the jurisdiction that issued the identification document. In the example 212B, the item is a carrot.

Because the fine-print features can be arranged to convey information specific to the jurisdiction that has issued the identification document, some implementations may correlate such information from the fine-print features with jurisdiction information printed on the identification document and use the correlation as an authentication factor to determine whether the identification document is genuine and has not been tempered with.

Figure 2E:
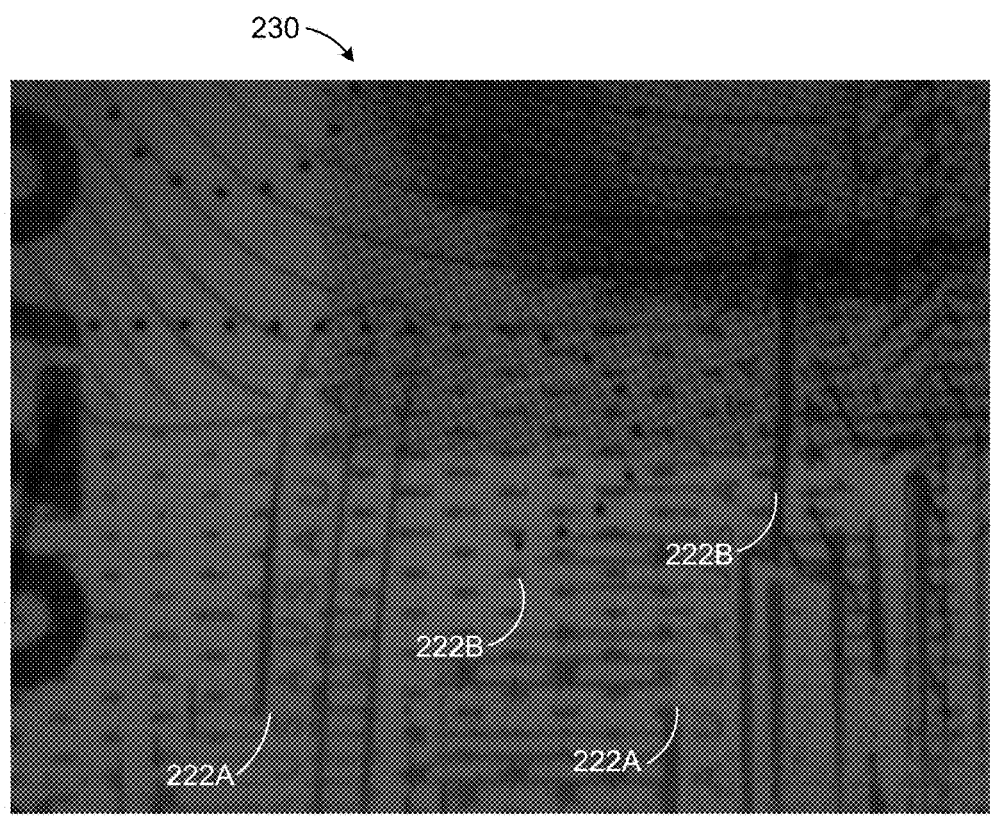
FIG. 2E illustrates yet still another example of an identification document with security features implemented as fine-print features.

FIG. 2E shows an example of fine-print feature present on a substrate 230 of the identification card 220. In one example, fine print may manifest as textual microprint 222A to encode a particular textual string, for example, "USA." The textual string may reference a particular jurisdiction, for example, a state, a municipality, a township. In another example, fine print may manifest as graphical microprint 222B to display signs or symbols. In this illustration, graphical microprint 222B includes dashed lines with smooth gaps in tween line segments and different dashes. Such fine-print features are fine grained at the micro-level. As such, they may be generally visible to an inspecting person only through magnifying glasses. Yet, the advent of high resolution scanners and cameras offer unprecedented resolution that can be integrated to leverage these microprints through a machine-assisted process. In particular, by scanning the substrate using, for example, smartphone devices, the microprints may be analyzed to determine that there are no gaps or bubbles among the dashed lines or line segments, a tell tail sign of a faked substrate. In a similar vein, the fine-print features may be analyzed to extract information encoding the issuing jurisdiction. In these examples, a database may be consulted to aid the analysis. The database may reside on the smartphone device, for example, after a template of the microprint information has been built up. The database may also reside remotely at a more centralized location. More interestingly, the extracted information encoding jurisdiction should correlate with, for example, the residence information associated with the PII that is printed on the identification document.

In more detail, the fine-print features may include embedded features to indicate the issuing agency. For example, each government agency approves unique substrate materials, further differentiated by artwork designs. These artwork designs may be known as "guilloche designs", and are specific to each agency or jurisdiction. Each document may have multiple fine-print features. Multiple fine-print features can give rise to multiple comparisons, each corroborating that the identification document is genuine and had not been tempered with. The multiple fine-print features may increase the difficulty of forgery and provide deterrence to counterfeit. Each comparison may also be performed by a smartphone device so that an overall confidence level is reached as to the authenticity of the identification document. The overall confidence may be built from a template created to assign weight to each comparison. The implementations are not limited to the use of a smartphone device. In fact, other forms of mobile computing device may be used as well, for example, a tablet device, a laptop device, or a wearable device.

Figure 3:
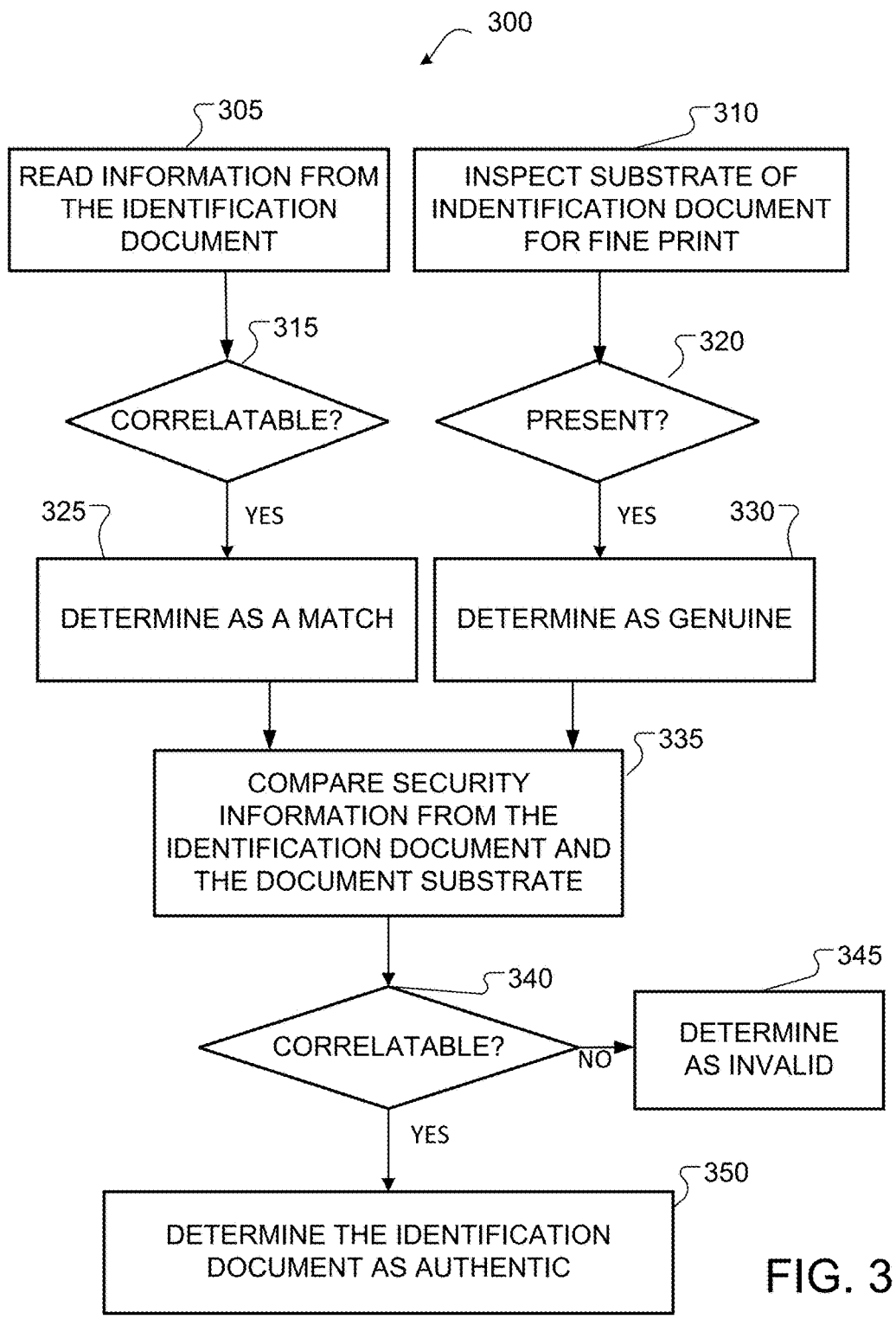
FIG. 3 shows an example of a process for automatic verification of an identification document with fine print features such as guilloche patterns on the substrate or a personalization layer different from the substrate or the cover.

FIG. 3 is a flow chart showing an example of a process 300 to combine the validation of the high resolution offset fine-print features from an issuer's substrate with the recognition of identity information on the ID document. The fine-print features may also be present in a personalization layer, or other value-added layer that is different from the substrate. Initially, a scanning device may read (for example, from the MRZ or by OCR), information from the identification document (305). The information may include PII encoded in various parts of the ID document. In some instances, various portions of the PII as read from different parts of the ID document may be correlated to each other to attest to the accuracy of the PII as well as the authenticity of the ID document (315). If correlation results match, a determination may be made with regard to the accuracy of the PII or the authenticity of the ID document containing the PII. This may form a first authentication factor. Additionally, because each ID document may be produced on, for example, an issuer provided substrate, further inspections of the substrate may provide supplemental proof that the ID document is genuine. Notably, such inspections may deter a would-be counterfeiter from substituting the underlying issuer's substrate with a replacement substrate so as to present an otherwise illegitimate ID document on a replacement substrate.

In some instances, the substrate of the ID document may be inspected (310). For example, the government substrates and raw materials used in producing ID documents may be strictly controlled. If presented credential is printed on official government materials, then there is a high degree of certainty that the document is authentic, and officially issued. The embedded information may generally include high resolution offset printing patterns, including, for example, guilloche designs, laser induced patterns, or other forms of fine printing that are specific to each agency or jurisdiction. As discussed, the high-resolution capability of camera on a smartphone device can capture such fine-print features with sufficient fidelity for automatic analysis. The capture produces may leverage not only the high-resolution capability but also the wide dynamic contrast range to reveal the gory details from the substrate. Indeed, detecting the presence of the fine-print features of the substrate (320) amounts to a second authentication factor (330). In some cases, the information identifying the issuer may be encoded by more than one fine-print patterns in the substrate. Information from the various fine-print patterns may be correlated and corroborated to determine whether the substrate is genuine. Such inspections may further corroborate that the document is authentic (330).

Once scanning process determines that the information on the ID document speaks to the authenticity while the information from the substrate supports that the underlying substrate is genuine, information obtained from the surface of the ID document and information obtained from the substrate may be compared to (325). In some cases, the PII portion may include information referencing the issuing agency, or a checksum of the identifying information of the issuing agency. Such information may be correlated with information scanned from the substrate (340). In response to a successful comparison, the ID document may be deemed adequate as an authentic ID document speaking to the identity of the holder as well as originating from the issuing agency (350). If the comparison is not successful, the ID document may be deemed invalid (345). Hence, this comparison can be the third authentication factor. Some implementations may entail more comparisons to correlate jurisdictional information content from the fine-print features with textual information printed on the ID document that has been scanned and recognized.

An example ID document can include a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066, 594, which is incorporated herein by reference in its entirety.) The information can, for example, include an indicium or indicia, such as the invariant or nonvarying information common to a large number of identification documents, for example the name and logo of the organization issuing the documents. The information may be formed by any known process capable of forming the indicium on the specific core material used.

Commercial systems for issuing ID documents are of two main types, namely so-called "central" issue (CI), and so-called "on-the-spot" or "over-the-counter" (OTC) issue. Both types are applicable to the laser write technology as disclosed herein.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. In this type of CI environment, an individual's identity may be asserted, through a government-issued breeder document.

Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a driver's license card through the mail. Delivery of credentials can be made by a variety of mail or courier services.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. This, an OTC card issuing process can be by its nature an intermittent-in comparison to a continuous-process.

The terms "indicium" and indicia as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultraviolet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a nonvisible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can include a plurality of separate laminate layers, for example a boundary layer and/or a film layer.

The degree of transparency of the laminate can, for example, be dictated by the information contained within the identification document, the particular colors and/or security features used, etc. The thickness of the laminate layers may vary, for example, in some implementations, the thickness of a laminate layer be about 1-20 mils. Lamination of laminate layer(s) to other layer of material (e.g., a core layer) can be accomplished using any conventional lamination process, and such processes are known to those skilled in the production of articles such as identification documents.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the description explains ID document structures (e.g., TESLIN-core, multi-layered ID documents) and fused polycarbonate structures as example structures. The discussions herein are generally relevant to articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethyleneterphthalate (PET), PET-G, PET-F, and polyvinyl chloride (PVC), and combinations thereof.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the subject innovation. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-assisted method, comprising:
   accessing, at a mobile computing device, information encoding a high-resolution image of an identification document, the high-resolution image captured from a camera of the mobile computing device;
   extracting, by the mobile computing device, personally identifiable information (PII) printed on more than one locations on the front of the identification document;
   correlating, by the mobile computing device, the PII from the more than one locations to determine a first authentication factor;
   inspecting, by the mobile computing device, the high-resolution image to detect at least one fine-print feature from a substrate of the identification document, the at least one fine-print feature not detectable by naked eyes alone and without a visual aid, the at least one fine-print presented by one or more glyph symbols that form a graphic pattern characteristic of an entity that issued the identification document;
   in response to (i) determining the first authentication factor that the PII from more than one locations match and (ii) determining a second authentication factor that the at least one fine-print feature is present, correlating, by the mobile computing device, the PII from the more than one locations with information content from the at least one fine-print feature to determine a third authentication factor and a fourth authentication factor; and
   in response to (i) determining the third authentication factor that the PII are correlated with information content from the at least one fine-print feature and (ii) determining that the graphic pattern characteristic correlates with information on the identification document that points to the issuing entity of the identity document, determining, by the mobile computing device, that the identification document as authentic.

2. The computer-assisted method of claim 1, wherein inspecting the high-resolution image to detect the at least one fine-print feature in one or more glyph symbols further comprises inspecting the high-resolution image to detect the at least one fine-print feature in glyph symbols that form a textual pattern characteristic of an entity that issued the identification document.

3. The computer-assisted method of claim 2, wherein determining the fourth authentication factor further comprise: determining that the textual pattern correlates with information on the identification document that points to the entity that issued the identity document.

4. The computer-assisted method of claim 2, wherein inspecting the high-resolution image to detect the at least one fine-print feature in one or more glyph symbols comprises inspecting the high-resolution image to detect the at least one fine-print feature in glyph symbols that form a textual pattern specific to the subject identified by the identification document.

5. The computer-assisted method of claim 4, wherein correlating the PII from the more than one locations with information content from the at least one fine-print feature comprises: correlating the PII from the more than one locations with information from the textual pattern specific to the subject identified by the identification document.

6. The computer-assisted method of claim 1, wherein inspecting the high-resolution image to detect the fine print feature from a substrate of the identification document comprises inspecting the high-resolution image to detect the at least one fine-print feature as line segments forming a graphic image.

7. The computer-assisted method of claim 1, wherein inspecting the high-resolution image to detect the fine print feature from a substrate of the identification document comprises inspecting the high-resolution image to detect the at least one fine-print feature as half-tone dots forming a graphic image.

8. The method of claim 1, wherein accessing information encoding a high-resolution image of an identification document comprises accessing the high-resolution image of at least 6 mega pixels as captured from the camera of the mobile computing device.

9. A mobile computing device, comprising a processor and a camera, wherein the camera is configured to capture a digital image of at least 10 mega pixels, and wherein the processor is configured to:
access information encoding a high-resolution image of an identification document, the high-resolution image captured from the camera of the mobile computing device;
extract personally identifiable information (PII) printed on more than one locations on the front of the identification document;
correlate the PII from the more than one locations to determine a first authentication factor;
inspect the high-resolution image to detect at least one fine-print feature from a substrate of the identification document, the at least one fine-print feature not detectable by naked eyes alone and without an assistive device, the at least one fine-print presented by one or more glyph symbols that form a graphic pattern characteristic of an entity that issued the identification document;
in response to (i) determining the first authentication factor that the PII from more than one location match and (ii) determining a second authentication factor that the at least one fine-print feature is present, correlate the PII from the more than one locations with information content from the at least one fine-print feature to determine a third authentication factor and a fourth authentication factor; and
in response to (i) determining the third authentication factor that the PII are correlated with information content from the at least one fine-print feature and (ii) determining that the graphic pattern characteristic correlates with information on the identification document that points to the issuing entity of the identity document, determine that the identification document as authentic.

10. The mobile computing device of claim 9, wherein the processor is configured to inspect the high-resolution image to detect the at least one fine-print feature in one or more glyph symbols by further inspecting the high-resolution image to detect the at least one fine-print feature in glyph symbols that form a textual pattern characteristic of an entity that issued the identification document.

11. The mobile computing device of claim 10, wherein the processor is configured to: determine the fourth authentication factor by further determining that the textual pattern correlates with information on the identification document that points to the entity that issued the identity document.

12. The mobile computing device of claim 9, wherein the processor is configured to: inspect the high-resolution image to detect the at least one fine-print feature in one or more glyph symbols by further inspecting the high-resolution image to detect the at least one fine-print feature in glyph symbols that form a textual pattern specific to the subject identified by the identification document.

13. The mobile computing device of claim 12, wherein the processor is configured to correlate the PII from the more than one locations with information content from the at least one fine-print feature by: correlating the PII from the more than one locations with information from the textual pattern specific to the subject identified by the identification document.

14. The mobile computing device of claim 9, wherein the processor is configured to inspect the high-resolution image to detect the fine print feature from a substrate of the identification document by inspecting the high-resolution image to detect the at least one fine-print feature as line segments forming a graphic image.

15. The mobile computing device of claim 9, wherein the processor is configured to inspect the high-resolution image to detect the fine print feature from a substrate of the identification document by inspecting the high-resolution image to detect the at least one fine-print feature as half-tone dots forming a graphic image.

* * * * *

UNITED STATES PATENT AND TRADEMARK OFFICE
CERTIFICATE OF CORRECTION

PATENT NO. : 10,095,924 B1
APPLICATION NO. : 15/395246
DATED : October 9, 2018
INVENTOR(S) : Stephen Miu et al.

Page 1 of 1

It is certified that error appears in the above-identified patent and that said Letters Patent is hereby corrected as shown below:

In the Claims

Column 15, Lines 13-14, Claim 3: please delete "comprise:" and insert therefor -- comprises: --

Signed and Sealed this
Seventh Day of May, 2019

Andrei Iancu
*Director of the United States Patent and Trademark Office*